United States Patent
Takeda et al.

(10) Patent No.: US 6,320,013 B1
(45) Date of Patent: Nov. 20, 2001

(54) PROCESS FOR PRODUCING MODIFIED PHENOLIC RESIN

(75) Inventors: Mitsunori Takeda; Masamichi Sato, both of Ibaraki (JP)

(73) Assignee: Kashima Oil Co., Ltd., Tokyo (JP)

( * ) Notice: Subject to any disclaimer, the term of this patent is extended or adjusted under 35 U.S.C. 154(b) by 0 days.

(21) Appl. No.: 09/601,336

(22) PCT Filed: Oct. 4, 1999

(86) PCT No.: PCT/JP99/05450

§ 371 Date: Aug. 10, 2000

§ 102(e) Date: Aug. 10, 2000

(87) PCT Pub. No.: WO00/34349

PCT Pub. Date: Jun. 15, 2000

(30) Foreign Application Priority Data

Dec. 10, 1998 (JP) .................................................. 10-351577

(51) Int. Cl.[7] .............................. C08G 14/04; C08G 8/32
(52) U.S. Cl. ...................... 528/158.5; 528/137; 525/480; 525/5.15; 525/517.5
(58) Field of Search ................................ 528/158.5, 137; 525/480, 501.5, 517.5

(56) References Cited

U.S. PATENT DOCUMENTS

| | | |
|---|---|---|
| 5,432,240 | 7/1995 | Tsumura et al. . |
| 5,484,854 | 1/1996 | Tsumura et al. . |
| 5,521,259 | 5/1996 | Tsumura et al. . |
| 5,792,826 | 8/1998 | Tsumura et al. . |

FOREIGN PATENT DOCUMENTS

| | | |
|---|---|---|
| 859374A2 | 8/1998 | (EP) . |
| 61-235413 | 10/1986 | (JP) . |
| 2-274714 | 11/1990 | (JP) . |
| 4-145116 | 5/1992 | (JP) . |
| 06-228257 | 8/1994 | (JP) . |
| 07-252339 | 10/1995 | (JP) . |
| 09-216927 | 8/1997 | (JP) . |
| 859374 * | 8/1998 | (JP) . |
| 10-251363A | 9/1998 | (JP) . |
| 10-251364A | 9/1998 | (JP) . |
| 10-316732A | 12/1998 | (JP) . |
| 11-217415A | 8/1999 | (JP) . |

OTHER PUBLICATIONS

Sovish, Preparation and polymerization of P–vinylphenol, J. Org. Chem., vol. 24, Sep./1959, 9.1345–1347.

* cited by examiner

Primary Examiner—Duc Truong
(74) Attorney, Agent, or Firm—Oblon, Spivak, McClelland, Maier & Neustadt, P.C.

(57) ABSTRACT

A process for producing a modified phenolic resin, comprising heating a heavy oil or pitch of given average molecular weight and, per mol, calculated from the average molecular weight, of the heavy oil or pitch; 0.3 to 25 mol, in terms of formaldehyde, a formaldehyde compound and 0.5 to 50 mol of a phenol of the formula (I) (wherein $R^1$ represents a linear or branched unsaturated hydrocarbon group having 1 to 2 unsaturated bonds and having 2 to 10 carbon atoms, p is 1 or 2, X represents an alkyl group having 1 to 5 carbon atoms, and q is 0 or 1) under stirring in the presence of an acid catalyst to thereby effect a polycondensation. The modified phenolic resin obtained by this process, as compared with the conventional modified phenolic resin produced from a heavy oil or pitch as a feedstock, has an extremely low softening point so as to be flowable at about room temperature and has also a low melt viscosity, thereby ensuring very excellent moldability. Further, in combination with an epoxy resin, the modified phenolic resin can be formed into a molded article which is excellent in not only heat resistance, moisture resistance, corrosion resistance and adhesive force but also mechanical properties such as dimensional stability and strength.

13 Claims, No Drawings

PROCESS FOR PRODUCING MODIFIED PHENOLIC RESIN

TECHNICAL FIELD

The present invention relates to a process for producing a modified phenolic resin which, as compared with the conventional modified phenolic resin produced from a heavy oil or pitch as a feedstock, has a low melt viscosity and has also an extremely low softening point, therefore being flowable even at about room temperature (25° C.), and thereby ensuring very excellent moldability, and which modified phenolic resin, in combination with an epoxy resin, provides a molding material that can be formed into a molded item being excellent in not only heat resistance, moisture resistance, corrosion resistance and adherence but also mechanical properties such as dimensional stability and strength.

BACKGROUND ART

Phenolic resin moldings are excellent in mechanical properties and hence have widely been employed for long either independently or in the form of a blend with another resin, such as an epoxy resin. However, the phenolic resin moldings have drawbacks in that the light and alkali resistances thereof are relatively low, that they are liable to absorb moisture or an alcohol and thereby suffering in some problems, such as change in the dimension and change of electrical resistance, and that the thermal resistance properties, especially the oxidation resistance at high temperature, thereof is poor.

In order to overcome these drawbacks, various modifications of the phenolic resin have been studied. For example, a variety of modified phenolic resins have been proposed, which have improved the resistances thereof to the deterioration and oxidation due to light, chemicals, etc. by virtue of the modification using a fat and oil, a rosin or a neutral aromatic compound.

Among the various proposals, for example, Japanese Patent Laid-open Publication No. 61(1986)-235413 discloses obtaining a phenolic resin of excellent heat resistance by using particular reactants of a phenol-modified aromatic hydrocarbon resin. However, the phenolic resin obtained by this method is disadvantageous in that, in the manufacturing of a molding by the use thereof, the phenolic resin cannot be cured unless being maintained at a high temperature for a prolonged period of time.

Japanese Patent Laid-open Publication No. 2(1990)-274714 discloses that a modified phenolic resin useful as a molding material, having such excellent heat and oxidation resistances and mechanical strength as cannot be expected from the conventional phenolic resin, which modified phenolic resin is obtained by employing as a modifier a petroleum heavy oil or pitch, which materials are commercially available at a low cost and using specific reaction conditions.

Further, Japanese Patent Laid-open Publication Nos. 4(1992)-145116 and 6(1994)-228257 disclose that, in the production of such a modified phenolic resin, a modified phenolic resin which would not corrode any metal members brought into contact with the resin can be provided by subjecting a crude modified phenolic resin obtained by a polycondensation of starting compounds to a neutralization treatment, a water washing treatment and/or an extraction treatment to thereby neutralize or remove any acids remaining in the crude modified phenolic resin.

However, the above modified phenolic resin has a drawback in that the melt viscosity thereof is so high that the modified phenolic resin is not suitable for rapid mass production of a molding with complex configuration. Moreover, there has been a demand for further enhancement of the heat resistance and mechanical properties, such as dimensional stability and strength, of a molding produced from the modified phenolic resin in combination with an epoxy resin.

In these circumstances, we, the present inventors have been proposed a process for producing a modified phenolic resin, in which a modified phenolic resin obtained by a polycondensation of a petroleum heavy oil or pitch, a phenol and a formaldehyde polymer, is reacted with a phenol in the presence of an acid catalyst so as to attain a reduction of the molecular weight with the result that a modified phenolic resin having a low melt viscosity and improved in the reactivity with an epoxy resin can be obtained (see Japanese Patent Laid-open Publication Nos. 7(1995)-252339 and 9(1997)-216927).

The modified phenolic resin thus obtained exhibits a high reactivity with an epoxy resin and has a low melt viscosity to thereby ensure an excellent moldability. Thus, in combination with the epoxy resin, the modified phenolic resin can provide a molding material which is excellent in not only heat resistance and moldability but also mechanical properties such as dimensional stability.

However, the known modified phenolic resins obtained by these processes, because being solid at about room temperature, must be heated so as to attain softening or melting thereof and inserted under pressure in a molding device in carrying out molding, for example, transfer molding.

On the other hand, in the use in molding raw materials, especially raw material for semiconductor seals, various package configurations are being proposed in conformity with the recent-year advance of the reduction of package size and weight. Extensive investigations are being conducted on liquid sealers that would not need a large-scale molding device in order to cope with the requirement for use of a large variety of packages in small amounts.

It is customary to employ acid anhydride and amine curing agents for the curing of epoxy resins for use in liquid sealers. These curing agents, however, have been unsatisfactory from the viewpoint of moistureproof reliability required for the above packages of reduced size and weight.

The use of phenolic resins, especially the modified phenolic resins above mentioned, as the curing agents would improve the performance such as moistureproof reliability. However, the phenolic resins are solid at about room temperature, so that it has been difficult to obtain liquid sealers exhibiting satisfied flowability on the use thereof.

The inventors have conducted various investigations and studies with a view toward developing a process capable of producing a modified phenolic resin of low softening point and low melt viscosity while maintaining the excellent performance of conventional modified phenolic resins. As a result, it has been found that a modified phenolic resin exhibiting flowability even at about room temperature and having low melt viscosity can be produced by polycondensation of a heavy oil or pitch, a formaldehyde compound and a specific phenol having unsaturated hydrocarbon group(s). The present invention has been completed on the basis of this finding.

The present invention has been made with a view toward solving the above problems of the prior art. Accordingly, the object of the present invention is to provide a modified phenolic resin which, as compared with the conventional modified phenolic resin produced from a heavy oil or pitch as a feedstock, has an extremely low softening point, therefore being flowable even at about room temperature (25° C.), and has also a low melt viscosity, thereby ensuring very excellent moldability, and which modified phenolic resin, in combination with an epoxy resin, can be formed into a molded item being excellent in not only heat resistance, moisture resistance, corrosion resistance and adhesive property but also mechanical properties such as dimensional stability and strength.

DISCLOSURE OF THE INVENTION

The process for producing a modified phenolic resin according to the present invention comprises heating:

a heavy oil or pitch of given average molecular weight;

0.3 to 25 mol, in terms of formaldehyde, a formaldehyde compound per mol, calculated from the average molecular weight, of the heavy oil or pitch; and 0.5 to 50 mol of a phenol of the following formula (I):

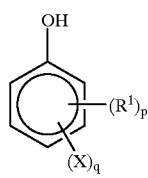

(I)

wherein $R^1$ represents a linear or branched unsaturated hydrocarbon group having 1 to 2 unsaturated bonds and having 2 to 10 carbon atoms, p is 1 or 2, X represents a substituent composed of an alkyl group having 1 to 5 carbon atoms, and q is 0 or 1, per mol, calculated from the average molecular weight, of the heavy oil or pitch; with stirring in the presence of an acid catalyst, thereby effecting a polycondensation.

In the process for producing a modified phenolic resin according to the present invention, it is preferred that the above phenol be an allylphenol.

In the process for producing a modified phenolic resin according to the present invention, the heavy oil or pitch can be petrolic or coalyheavy oil or pitch, especially a specified distillate or residue oil obtained by a catalytic cracking operation, thermal cracking operation or catalytic reforming operation of an oil refinery process. As a solvent, an aromatic hydrocarbon compound, an aliphatic hydrocarbon compound or a mixture thereof can be added thereto.

In the process for producing a modified phenolic resin according to the present invention, it is preferred that a Brønsted acid selected from the group consisting of organic acids, inorganic acids and solid acids be used as the acid catalyst.

BEST MODE FOR CARRYING OUT THE INVENTION

Hereinbelow, the present invention will be described in greater detail.

In the process for producing a modified phenolic resin according to the present invention, a modified phenolic resin is produced by heating specified amounts of a heavy oil or pitch, a formaldehyde compound and a specified phenol of the formula (I), or allylphenol, with stirring in the presence of an acid catalyst, thereby effecting a polycondensation.

Both a coal stock oil and a petroleum stock oil can be used as the heavy oil or pitch constituting a feedstock for the polycondensation reaction of the present invention. As the petroleum heavy oil or pitch, a distillation residuum, hydrocracking residuum, catalytic cracking residuum or catalytic reforming residuum of crude oil; a thermal cracking residuum of naphtha or LPG; a vacuum distillate, extract by solvent extraction or thermal treatment product from these residua; a specified distillate or residual oil obtained by cracking operation such as thermal cracking or catalytic cracking in an oil refinery process; a residual oil obtained by catalytic reforming of naphtha or the like; or a vacuum distillate of these residual oils may be cited for example. On the other hand, as the coal heavy oil or pitch, a specific fraction obtained by distillation of coal tar produced by dry distillation of coal, a heavy oil obtained by coal liquefaction, or the like may be cited for example.

With respect to the petroleum heavy oil or pitch, it is preferred to select and use one whose ratio of aromatic hydrocarbon (fa value) and ratio of aromatic ring hydrogen (Ha value) are appropriate.

For example, it is preferred that the petroleum heavy oil or pitch have an fa value ranging from 0.40 to 0.95, preferably from 0.5 to 0.8, and more preferably from 0.55 to 0.75, and have an Ha value ranging from 20 to 80%, preferably from 20 to 60%, and more preferably from 20 to 50%.

The fa value and the Ha value are calculated by the following formulae from the data obtained by $^{13}$C-NMR and $^1$H-NMR measurements of the petroleum heavy oil or pitch.

$$fa \text{ value} = \frac{\text{number of aromatic carbon atoms in oil or pitch}}{\text{total number of carbon atoms in oil or pitch}}$$

$$Ha \text{ value} = \frac{\text{number of hydrogen atoms of aromatic rings in oil or pitch}}{\text{total number of hydrogen atoms in oil or pitch}} \times 100 (\%)$$

When the fa value of the petroleum heavy oil or pitch as a feedstock is smaller than 0.4, the aromatic content is low, so that the reforming effects in properties of obtained modified phenolic resin, particularly, the reforming effects for thermal resistance and anti-oxidation property thereof, tend to become low.

On the other hand, when the petroleum heavy oil or pitch has an fa value of greater than 0.95, the reactivity of aromatic carbon with formaldehyde tends to become unfavorably low.

When the Ha value of the petroleum heavy oil or pitch as a feedstock is smaller than 20%, the amount of hydrogen atoms in the aromatic ring reacting with formaldehyde is reduced, thereby causing the reactivity of the feedstock to be low, so that the reforming effect thereof for the properties of the phenolic resin tends to become low.

On the other hand, when a petroleum heavy oil or pitch having an Ha value of greater than 80% is used as a feedstock, the strength of the modified phenolic resin tends to become poor.

From the viewpoint of, for example, stable supply of feedstocks, it is especially preferred to use, as the above petroleum heavy oil or pitch, a distillate or residue oil obtained by a cracking or reforming operation such as a thermal cracking operation, catalytic cracking operation or catalytic reforming operation of an oil refinery process.

Examples of feedstocks for use in such a cracking or reforming operation of an oil refinery process include residual oils, refined oils and intermediate refined oils, such as tar sand, a straight-run heavy gas oil, reduced crude or vacuum residue obtained by a distillation operation and a desulfurized vacuum heavy gas oil or desulfurized heavy oil obtained by a desulfurization operation. Among these residual oils, refined oils and intermediate refined oils, generally, tar sand, reduced crude and vacuum residue are used in thermal cracking. Straight-run heavy gas oil, reduced crude, desulfurized vacuum heavy gas oil and desulfurized heavy oil are used in catalytic cracking. Straight-run naphtha, etc. are used in catalytic reforming.

The catalytic cracking, thermal cracking and catalytic reforming methods that can be applied to the production of the above distillates and residual oils are not particularly limited as long as the distillates and residual oils having the above desired properties can be obtained. Any of the processes having been applied in the field of oil refinery can be employed. Thus, for the catalytic cracking, there can be mentioned, for example, the moving-bed catalytic cracking process, the air lift thermofor catalytic cracking process, the Houdriflow catalytic cracking process, the fluid-bed catalytic cracking (FCC) process, the UOP catalytic cracking process, the Shell catalytic cracking process, the Esso IV-type catalytic cracking process and the Orthoflow catalytic cracking process. Further, for the thermal cracking, there can be mentioned, for example, the delayed coking process, the fluid coking process, the flexicoking process, the visbreaking process, the Yurika process, the CHERY-P process, the ACTIV process, the KKI process, the coke fluid bed coking process and the ACR process. Still further, for the catalytic reforming, there can be mentioned, for example, the platforming process, the power forming process, the catforming process, the Houdriforming process, the Rheniforming process, the hydroforming process and the hyperforming process.

Catalytic cracking products, thermal cracking products and catalytic reforming products obtained by the above processes in the stage of cracking or reforming have different boiling points and are separable into fractions whose compound compositions are variable from each other. Of these, the distillates and residual oils suitable for the present invention are those having the above ratio of aromatic hydrocarbon (fa value) and ratio of aromatic ring hydrogen (Ha value), the boiling point lower limit (distillate outflow initiation temperature) of which is 170° C. or higher, preferably 180° C. or higher, and more preferably 190° C. or higher.

When use is made of a distillate whose boiling point lower limit (distillate outflow initiation temperature) is below 170° C., the content of condensed polycyclic aromatic components in the stock oil is so small that a reactivity drop is caused.

The fraction obtained by distillation of coal tar mentioned above as a coal feedstock is one having a boiling point of over 200° C., preferably 200 to 360° C.

Dry distillation of coal is an inevitable process in the industry of coal chemistry, which is carried out for producing gas, coal tar and coke from coal.

The coal tars produced by the above dry distillation of coal can be classified depending on the employed method of dry distillation into the coke oven tar, horizontal retort tar, vertical retort tar, producer gas tar and water gas tar.

Further, the coal tars can be classified depending on the level of dry distillation temperature into the high temperature tar (900 to 1200° C.) and low temperature tar (450 to 700° C.), these different from each other in the composition and properties.

Although the fraction for use as the coal heavy oil or pitch in the present invention may be any of coal tar distillates as long as these have the above boiling points, high temperature tars such as coke oven tar are preferred from the viewpoint that the content of desired distillation components is high.

Various fractions can be obtained by distillation of the above coal tars. For example, upon distillation of coke oven tar obtained at a coke production, there are produced fractions such as the tar light oil (boiling point: about 94 to 178° C.), carbol light oil (carbolic acid oil, boiling point: about 168 to 200° C.), naphthalene oil (intermediate oil) and wash oil (boiling point: about 202 to 223° C.), heavy oil (boiling point: about 218 to 314° C.), anthracene oil (boiling point: about 296 to 360° C.) and pitch (residuum, boiling point: about 450° C. or over).

Of these, the fractions whose boiling point exceeds 200° C. are naphthalene oil, wash oil, heavy oil, anthracene oil and pitch.

These fractions having the above boiling points can be used, either individually or in combination, as the coal heavy oil or pitch in the present invention. Moreover, use can be made of mixtures obtained by separating and recovering specified components from these fraction mixtures and mixing the components together. For example, use can be made of creosote oil obtained by separating and recovering naphthalene, anthracene, tar acids, tar bases, etc. from a fraction mixture having a boiling point of not lower than that of naphthalene oil and mixing them together.

With respect to the coal (coal tar) heavy oil or pitch, as compared with the petroleum heavy oil or pitch, the reaction with formaldehyde compounds proceeds irrespective of generally having greater fa and Ha values. Therefore, it is presumed that there is a fundamental difference in the reactivity with formaldehyde compounds, attributed to molecular structure, between the coal stock oil and the petroleum stock oil.

When use is made of a fraction whose boiling point is 200° C. or below, the content of condensed polycyclic aromatic components in the stock oil is so small that a reactivity drop is caused.

Coal liquefaction is carried out for producing gasoline, etc. from coal, which is an operation wherein high-pressure (200 to 700 atm) hydrogen acts on coal at high temperature, for example, about 500° C., so as to induce reactions such as cleavage of coal structure, deoxidization, desulfurization, denitrification and hydrogenation with the result that lower hydrocarbons are obtained.

In the present invention, the heavy oil produced by the above coal liquefaction can be used as the coal heavy oil or pitch. This heavy oil may be used either individually or in combination with at least one member of the above coal tar fractions.

The described coal heavy oil and pitch are items which are stably produced by customary operations in the industry of coal chemistry. Therefore, the use thereof enables stable supply of feedstocks at low cost.

In the present invention, the coal heavy oil and pitch can directly be used without any further treatment. However, since acidic compounds such as phenols and carboxylic acids and also basic compounds such as carbazoles, pyridines, anilines and quinolines may be contained therein, it is preferred that these be removed before use.

The removal of such acidic compounds and basic compounds can be accomplished by the extraction with, for example, sulfuric acid or sodium hydroxide.

The described petroleum heavy oil or pitch and coal heavy oil or pitch, although the number of condensed rings of aromatic hydrocarbons constituting the same is not particularly limited, are preferably mainly composed of condensed polycyclic aromatic hydrocarbons each of which has at least two rings. When the heavy oil or pitch is mainly composed of monocyclic aromatic hydrocarbons, the reactivity with formaldehyde is so low that the effect in refinement of the resultant phenolic resin tends to become poor.

The obtained heavy oil or pitch, although can be directly subjected to polycondensation reaction without any further treatment, may be subjected to a treatment for removing a paraffin fraction of low reactivity, namely, a fraction of saturated hydrocarbons having 15 to 40 carbon atoms which involves normal paraffin, isoparaffin, cycloparaffin, etc., before use in polycondensation.

This treatment for removing such a paraffin fraction can be effected by, for example, column chromatography, or extraction with furfural or other solvents at 80 to 120° C. according to the conventional procedure.

Examples of packing materials which are incorporated in columns for use in the column chromatography include activated alumina gel and silica gel. These packing materials can be used either individually or in combination.

Further, examples of developers for use in the chromatography include aliphatic saturated hydrocarbon compounds having 5 to 8 carbon atoms such as n-pentane, n-hexane, n-heptane and n-octane, ethers such as diethyl ether, halogenated hydrocarbons such as chloroform and carbon tetrachloride, and alcohols such as methyl alcohol and ethyl alcohol. It is preferred that these developers be used in appropriate combination.

Performing of the treatment for removing the paraffin fraction enables not only enhancing the favorable effect on the performance of the modified phenolic resin but also reducing the amount of unreacted components contained in the reaction mixture after polycondensation reaction, and thereby facilitating purification processing.

The phenol used as a feedstock in combination with the heavy oil or pitch in the process for producing a modified phenolic resin according to the present invention is a phenol having unsaturated hydrocarbon group(s), represented by the following formula (I):

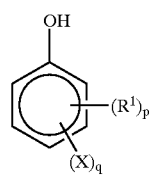

(I)

In the formula (I), $R^1$ represents a linear or branched unsaturated hydrocarbon group having 1 to 2 unsaturated bonds, preferably one unsaturated bond, and having 2 to 10 carbon atoms, preferably 3 to 10 carbon atoms, and more preferably 3 to 5 carbon atoms.

As the linear unsaturated hydrocarbon group, for example, a linear alkenyl group or a linear alkadienyl group may be cited.

As the linear alkenyl group, for example, vinyl groups, propenyl (allyl) groups, butenyl groups, pentenyl groups, hexenyl groups, heptenyl groups, octenyl groups, nonenyl groups and decenyl groups may be cited.

The double bond may be present at any arbitrary position of these linear alkenyl groups. For example, the propenyl group may be 1- or 2-propenyl; the heptenyl group may be any of 1- to 6-heptenyls; and the decenyl group may be any of 1- to 9-decenyls. This is applicable to other linear alkenyl groups.

As the linear alkadienyl group, for example, a butadienyl group, pentadienyl groups, hexadienyl groups, heptadienyl groups, octadienyl groups and nonodienyl groups may be cited.

The double bond may be present at any two arbitrary positions of these linear alkadienyl groups. Although the butadienyl group is only 1,3-butadienyl, the pentadienyl group may be any of 1,3-, 1,4- and 2,4-pentadienyls, and, further, the heptadienyl group may be any of 1,3-, 1,4-, 1,5-, 1,6-, 2,4-, 2,5-, 2,6-, 3,5-, 3,6- and 4,6-heptadienyls. This is applicable to other linear alkadienyl groups.

As the branched unsaturated hydrocarbon group, for example, a branched alkenyl group or branched alkadienyl group represented by the following formula (i) may be cited:

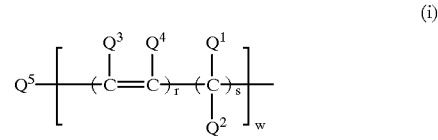

(i)

wherein each of $Q^1$, $Q^2$, $Q^3$ and $Q^4$ independently represents hydrogen, a linear or branched alkyl group having 1 to 7 carbon atoms, or a linear or branched alkenyl group having 1 to 7 carbon atoms; and $Q^5$ represents hydrogen or a linear or branched alkyl group having 1 to 7 carbon atoms.

As the linear or branched alkyl group having 1 to 7 carbon atoms, for example, a methyl group, an ethyl group, propyl groups, butyl groups, pentyl groups, hexyl groups, heptyl groups, an isopropyl group and isopentyl groups may be cited.

The linear alkenyl group having 1 to 7 carbon atoms can be, for example, any of the linear alkenyl groups having 1 to 7 carbon atoms mentioned above as being represented by $R^1$.

In the formula (i), r is 1 or 2, s is 0 to 8, and w is 1 or 2, provided that r, s and w are selected so that, depending on the types of selected $Q^1$ to $Q^5$, the total number of double bonds is 1 to 2 and the total number of carbon atoms is 2 to 10.

In the phenol of the formula (I), there are 1 to 2 unsaturated hydrocarbon groups $R^1$, preferably one unsaturated hydrocarbon group $R^1$, which may be bonded to the aromatic ring at any arbitrary position thereof. When there are a plurality of unsaturated hydrocarbon groups $R^1$, these may be identical with or different from each other.

In the formula (I), X represents an alkyl group having 1 to 5 carbon atoms.

As the alkyl group having 1 to 5 carbon atoms, for example, a methyl group, an ethyl group, propyl groups, butyl groups, pentyl groups or an isopropyl group may be cited.

In the phenol of the formula (I), the group X may be existing in 0 or 1 number. That is, the group X may be present or absent. When the group X is present, it may be bonded to the aromatic ring at any arbitrary position thereof.

Specific examples of the phenols of the formula (I) include:

phenols having a linear unsaturated hydrocarbon group as $R^1$ such as 2- to 4-(1-propenyl)phenol and 2- to 4-(2-propenyl)phenol, and phenols having a branched unsaturated hydrocarbon group as $R^1$ such as 2- to 4-(1-methyl-1-propenyl)phenol and 2- to 4-(1-methyl-2-propenyl)phenol.

Of these, propenyl(or allyl)phenols such as 2- to 4-(1-propenyl)phenol and 2- to 4-(2-propenyl)phenol, 2- to 4-(1-methyl-1-propenyl)phenol and 2- to 4-(1-methyl-2-propenyl)phenol are preferred, and allylphenols are particularly preferred, from the viewpoint of procurement easiness, cost, etc.

In the process for producing a modified phenolic resin according to the present invention, it is preferred that the phenol represented by the formula (I) be used in an amount of 0.5 to 50 mol, preferably 1.0 to 50 mol, more preferably 1.0 to 40 mol, and yet still preferably 1.0 to 30 mol, per mol, calculated from the average molecular weight, of the heavy oil or pitch.

If the phenol of the formula (I) is used in an amount of less than 0.5 mol, it is possible to increase a viscosity and reduce a reactivity with an epoxy resin. On the other hand, if the amount of phenol exceeds 50 mol, the effect of the phenolic resin modification on the performance improvement tends to become poor.

An aromatic hydrocarbon compound may be used as a further feedstock for synthesis in the process for producing a modified phenolic resin according to the present invention.

Not only formaldehyde but also linear polymers such as paraformaldehyde and polyoxymethylene (especially, oligomer) and cyclic polymers such as trioxane can be mentioned as examples of the formaldehyde compounds that can be employed in the polycondensation reaction of the present invention.

These formaldehyde compounds act as a crosslinking agent. Especially, paraformaldehyde and formaldehyde are preferred. The formaldehyde compound may be dissolved in an appropriate solvent such as water before use. Thus, formaldehyde may be used in the form of an aqueous solution of appropriate concentration. It is preferably used as a formalin (concentration: 35% or higher).

In the process for producing a modified phenolic resin according to the present invention, it is preferred that the formaldehyde compound be used in an amount of, in terms of formaldehyde, 0.3 to 25 mol, preferably 0.5 to 25 mol, more preferably 1.0 to 20 mol, and yet still preferably 1.0 to 15 mol, per mol, calculated from the average molecular weight, of the heavy oil or pitch.

When the amount of formaldehyde compound is less than 0.3 mol per mol of the heavy oil or pitch, the resin yield may be lowered and curing products from the obtained modified phenolic resin may have poor strength. On the other hand, when the amount is greater than 25 mol, the molecular weight of the obtained modified phenolic resin may be increased to such an extent that the desired viscosity cannot be attained.

In the polycondensation reaction of the process for producing a modified phenolic resin according to the present invention, an acid catalyst is used for polycondensing the heavy oil or pitch, the formaldehyde compound and the phenol of the formula (I). Brønsted and Lewis acids can be used as such an acid catalyst. Brønsted acids are preferred. Examples of Brønsted acids include organic acids such as oxalic acid, toluenesulfonic acid, xylenesulfonic acid and formic acid; inorganic acids such as hydrochloric acid and sulfuric acid; and solid acids such as acidic cation exchange resins.

Of these Brønsted acids, oxalic acid and sulfuric acid are preferred as the organic acids and inorganic acids.

The acidic cation exchange resin used as the solid acid is a resin comprising a matrix resin with a three-dimensional network structure to which cation exchange groups are bonded by covalent bond.

As the matrix resin, for example, polystyrene, styrene/divinylbenzene copolymer, poly(meth)acrylic acid or polyacrylonitrile may be cited. As the cation exchange group, for example, a strongly acidic group such as a sulfonate group or a weakly acidic group such as a carboxyl group may be cited.

It is generally preferred that the acidic cation exchange resin as an acid catalyst be used in the form of spheres of 15 to 50 mesh in particle size.

Examples of suitable acidic cation exchange resins include strong acidic cation exchange resins such as Diaion SKIB, PK216, SK104 and PK208 (trade names, produced by Mitsubishi Chemical Industries, Ltd.), Amberlite IR-120B and IR-112 (trade names, produced by Japan Organo Co., Ltd.), Dowex 50wx 8, HCR and HGR (trade names, produced by Dow Chemical Co., Ltd.) and Duolite C-20 and C-25 (trade names, produced by SUMITOMO CHEMICAL CO., LTD.) and weak acidic cation exchange resins such as Diaion WK10 (trade name, produced by Mitsubishi Chemical Industries, Ltd.), Amberlite IRc-50 (trade name, produced by Japan Organo Co., Ltd.) and Duolite CS-101 (trade name, produced by SUMITOMO CHEMICAL CO., LTD.).

When these solid acids are used as the acid catalyst, it can be prevented that the acid catalyst is contained in liberated form in the reaction mixture. Thus, there is an advantage that the modified phenolic resin substantially free from acids can be obtained by removing the solid acid from the polycondensation reaction product by simple means such as filtration.

In the process of the present invention, the above acid catalyst is used in an amount of not less than 0.01 mol, preferably not less than 0.05 mol, but not more than 3 mol, preferably not more than 2 mol, per mol, calculated from the average molecular weight, of the heavy oil or pitch. When the acidic cation exchange resin is used as the acid catalyst, the above amount of acid catalyst is that in terms of cation exchange groups.

When the amount of added acid catalyst is too small, the reaction time tends to be prolonged. Further, when the reaction temperature is not satisfactorily high, the reaction tends to be incomplete. On the other hand, it may occur that the reaction rate is not increased in proportion to the increase of the amount of added acid catalyst, disadvantageously from the viewpoint of cost.

In the process for producing a modified phenolic resin according to the present invention, the specified amounts of feedstocks described above are polycondensed in the presence of the acid catalyst.

In the polycondensation reaction of the above heavy oil or pitch, phenol of the formula (I) and formaldehyde compound in the presence of the acid catalyst, the addition sequence of feedstocks and catalyst, the feedstock mixing temperature and mixing time and the polycondensation reaction temperature and reaction time are controlled in conformity with the feedstock composition and the properties of obtained resin. The reaction temperature and reaction time are naturally conditions which influence each other.

This polycondensation reaction can be performed in, for example, the following sequence of addition.

(1) First, the above specified amounts of heavy oil or pitch, phenol, formaldehyde compound and acid catalyst are stirred at such a temperature that the polycondensation reaction does not proceed, for example, 50° C. or below, preferably 40 to 50° C., to thereby obtain a homogeneous mixture.

Subsequently, the temperature of the obtained mixture is slowly raised to 50–200° C., preferably 80–200° C., and more preferably 80–180° C., and a polycondensation reaction is carried out for a period of 15 min to 8 hr, preferably 30 min to 6 hr.

The mixing condition of polymerization feedstocks is not limited as long as a homogeneous mixture can be obtained before an advance of polycondensation reaction. For example, the mixing may be carried out while the temperature is slowly raised to the polycondensation reaction temperature.

In the process for producing a modified phenolic resin according to the present invention, at least any of the heavy oil or pitch, acid catalyst and formaldehyde compound may be added in a sequential manner at the polycondensation reaction of the above feedstocks in the presence of the acid catalyst.

That is, in the process for producing a modified phenolic resin according to the present invention, the polycondensation reaction may further be carried out in any of the following addition sequences (2) to (7).

(2) First, the heavy oil or pitch and the phenol are mixed together and heated under stirring. Subsequently, the formaldehyde compound and the acid catalyst are sequentially added to the mixture being heated under stirring.

In this addition sequence, the acid catalyst and the whole amount of formaldehyde compound may be added sequentially. Alternatively, an aliquot of the formaldehyde compound may be added to the mixture being heated under stirring, followed by sequential addition of another aliquot of formaldehyde compound together with the acid catalyst.

(3) First, the heavy oil or pitch, phenol and formaldehyde compound are mixed together and heated under stirring. Subsequently, only the acid catalyst is sequentially added to the mixture being heated under stirring.

(4) First, the heavy oil or pitch, phenol and acid catalyst are mixed together and heated under stirring. Subsequently, only the formaldehyde compound is sequentially added to the mixture being heated under stirring.

(5) First, the heavy oil or pitch and the acid catalyst are mixed together and heated under stirring. Subsequently, the phenol and the formaldehyde compound are sequentially added to the mixture being heated under stirring.

(6) First, the formaldehyde compound and the acid catalyst are mixed together and heated under stirring. Subsequently, the heavy oil or pitch and the phenol are sequentially added to the mixture being heated under stirring.

(7) First, the heavy oil or pitch, formaldehyde compound and acid catalyst are mixed together and heated under stirring. Subsequently, the phenol is sequentially added to the mixture being heated under stirring.

In these feedstock and catalyst addition sequences (2) to (7) as well, it is preferred that the sequential addition of the heavy oil or pitch, acid catalyst and/or formaldehyde compound be performed over a period of 10 to 120 min, preferably 20 to 80 min, by dropping or other methods.

When the addition time is less than 10 min, unfavorably, the reaction may be advanced so rapidly as to become highly exothermic with the result that the temperature control becomes difficult. On the other hand, when the addition time exceeds 120 min, prolonged addition causes a cost increase.

In the polycondensation reaction of the present invention, the initiation time of the sequential addition to the mixture being heated under stirring is not particularly limited. For example, the sequential addition can be initiated while the mixture being heated under stirring is in homogeneously mixed form and the temperature thereof is stabilized.

In the above addition sequence (2), the formaldehyde compound is sequentially added together with the acid catalyst. The sequential addition of the formaldehyde compound may be initiated or terminated synchronously with the sequential addition of the acid catalyst. In that instance, both are preferably mixed together. Alternatively, the sequential addition of formaldehyde compound may be separate from that of acid catalyst. In that instance, the sequential addition of formaldehyde compound may be synchronous with that of acid catalyst, or, for example, may be initiated before that of acid catalyst.

In the polycondensation reaction of the heavy oil or pitch, phenol and formaldehyde compound in the presence of the acid catalyst, which polycondensation reaction is carried out by adding the feedstocks and acid catalyst in the above sequences, the reaction temperature and reaction time are controlled in conformity with the feedstock composition, the addition speed of acid catalyst and the properties of obtained resin. The reaction temperature and reaction time are naturally conditions which influence each other.

In the above addition sequences, the polycondensation reaction can be performed under, for example, the following conditions.

Specifically, first, the feedstocks comprising the heavy oil or pitch and the phenol, optionally together with at least part of the formaldehyde compound or the acid catalyst, are heated under stirring at 30 to 120° C., preferably 40 to 80° C., prior to the addition of the formaldehyde compound and/or acid catalyst, thereby obtaining a homogeneous mixture.

Subsequently, the formaldehyde compound and/or acid catalyst is sequentially added with attention paid to a rapid temperature increase of the reaction mixture.

After the completion of addition of the formaldehyde compound and/or acid catalyst, the temperature of the reaction mixture is raised to 50–200° C., preferably 80–200° C., and more preferably 80–180° C., and a reaction is carried out for a period of 15 min to 8 hr, preferably 30 min to 6 hr.

In the process of the present invention, the above polycondensation reaction of the heavy oil or pitch, formaldehyde compound and phenol, although can be performed without the use of any solvent, may be carried out while lowering the viscosity of the reaction mixture (reaction system) with the use of an appropriate solvent so as to effect a homogeneous reaction.

Examples of such solvents include nitro-substituted aromatic hydrocarbons such as nitrobenzene, nitro-substituted aliphatic hydrocarbons such as nitroethane and nitropropane, and halogenated aliphatic hydrocarbons such as perchlene, trichlene and carbon tetrachloride.

The modified phenolic resin obtained by the described process of the present invention has an extremely low softening point, generally 30° C. or below (20° C. or below, depending on conditions), and accordingly exhibits flowability at about room temperature (25° C.).

It is preferred that the modified phenolic resin have a hydroxyl equivalent ranging from 150 to 250. When the hydroxyl equivalent is less than 150, there is the possibility that the moisture resistance is poor. On the other hand, when the hydroxyl equivalent exceeds 250, the gel time may be prolonged until an effect adverse from the viewpoint of production efficiency is exerted.

The reason for such a low softening point exhibited by the modified phenolic resin obtained by the process of the present invention is presumed to be that the phenol having an unsaturated hydrocarbon group, represented by the formula (I), has such a low symmetry that the crystallinity of the modified phenolic resin having the same introduced therein is lowered, and/or has a double bond which reduces the intermolecular force of the modified phenolic resin having the same introduced therein.

Although the thus produced modified phenolic resin can be applied to various uses, it is probable for unreacted components, acid catalyst, etc. to remain therein. Therefore, it is preferred that the modified phenolic resin be subjected to appropriate purification in order to remove unreacted components, low molecular weight components, acid catalyst, reaction solvent, etc.

As the method for purifying the reaction mixture, namely, the crude modified phenolic resin involving unessentially the acid catalyst, unreacted components, low molecular weight components and reaction solvent, there can be mentioned, for example, purification treatment (i) in which unreacted components are removed from the reaction mixture, purification treatment (ii) in which catalyst residue is removed from the reaction mixture, and purification treatment (iii) in which remaining phenols are removed by any of steam distillation, nitrogen gas blowing and vacuum distillation.

In the above purification treatment (i), those among the components contained in the heavy oil or pitch as a feedstock which have low reactivity so as to remain in unreacted or incompletely reacted form in the reaction mixture and the reaction solvent optionally used in the reaction are removed.

In the first treatment in which unreacted components are removed from the reaction mixture, the polycondensation reaction product obtained in the above polycondensation reaction is contacted with a specified extraction solvent at such a temperature that the reaction mixture becomes fluid in order to remove unreacted components involved in the reaction mixture, for example, components of low reactivity contained in the heavy oil or pitch and, in addition to those, low molecular weight components remaining in incompletely reacted form.

The expression "such a temperature that the reaction mixture becomes fluid" used herein means the temperature at which the reaction mixture in combination with the extraction solvent, forms a liquid-liquid binary phase and thus can maintain its liquid state, or the temperature at which the reaction mixture is dissolved in the extraction solvent and thus can maintain its liquid state. The rate and efficiency of dissolution of unreacted components contained in the reaction mixture into the extraction solvent can be increased by heating the reaction mixture to the temperature at which the fluidity can be maintained while contacting the reaction mixture with the extraction solvent.

The extraction solvent for use in the first treatment is a solvent which, at the above temperature, forms a liquid-liquid binary phase system or a solution in cooperation with the reaction mixture whose principal component is the modified phenolic resin and which, at lower temperatures, forms a liquid-liquid binary phase system or a liquid-solid binary phase system in cooperation with the reaction mixture. For example, the extraction solvent is one selected from among aliphatic hydrocarbons having 6 to 20 carbon atoms, alicyclic hydrocarbons having 6 to 20 carbon atoms, aromatic hydrocarbons having 6 to 20 carbon atoms and aliphatic petroleum fractions.

Examples of the aliphatic hydrocarbons include hexane, heptane, octane, nonane, decane, undecane, dodecane, tridecane, tetradecane, pentadecane and hexadecane.

Examples of the alicyclic hydrocarbons include cyclohexane, cycloheptane and cyclooctane.

Examples of the aromatic hydrocarbons include benzene, toluene and xylene.

Examples of the aliphatic petroleum fractions include kerosene and naphtha.

These compounds, as the extraction solvent, may be used either individually or in combination. Of these compounds, n-heptane, n-octane and naphtha are particularly preferred.

In the present invention, the contacting of the reaction mixture with the extraction solvent can be accomplished by adding both in the same vessel and heating to such a temperature that the reaction mixture becomes fluid. Also, the contacting of the reaction mixture with the extraction solvent may be initiated by heating the reaction mixture to desired temperature and adding the extraction solvent of the same temperature thereto, or may be initiated by adding the former to the latter.

When the reaction mixture is contacted with the extraction solvent, stirring and mixing of both enables enhancing the efficiency of extraction of unreacted components. In particular, when the reaction mixture and the extraction solvent form a liquid-liquid binary phase, the enhancement of contact area of mutual phases by means of the stirring force promotes the rapid and efficient extraction of unreacted components.

This first treatment may be carried out while refluxing, or instead in a closed system, in order to prevent the loss of extraction solvent by evaporation.

In the first treatment, it is preferred that the contacting of the reaction mixture with the extraction solvent be performed at, for example, 50 to 200° C., preferably 70 to 130° C., and more preferably 80 to 120° C.

The extraction solvent for use in the first treatment, although the amount thereof can appropriately be selected depending on the amount of unreacted components contained in the reaction mixture, the amount of unreacted components to be removed by the first purification treatment, etc., is preferably used in an amount of, for example, 0.5 to 4 ml, preferably 1 to 2 ml, per g of the reaction mixture.

In the first treatment, the contact time, although not particularly limited, is generally in the range of 10 to 60 min, preferably 20 to 30 min. Thus, rapid treatment can be performed.

A liquid-liquid binary phase system or a liquid-solid binary phase system is formed by allowing the reaction mixture and extraction solvent to cool undisturbed or allowing them to stand still while cooling after the completion of the described contacting operation. The unreacted components dissolved in the extraction solvent can be easily removed from the reaction mixture by separating the extraction solvent by decantation or other methods.

The first treatment is carried out by performing the above contacting operation and separating operation in this sequence. The number of contacting operation and separating operation sequences is not particularly limited. The contacting operation and separating operation may be performed only once, or may be repeated plural times while renewing the extraction solvent.

In the first treatment, the extraction operation is performed while the reaction mixture is in fluid form, so that unreacted components can be efficiently removed with the use of a small amount of solvent. Further, it is not needed to maintain a liquid-solid binary phase system during the contacting operation, so that setting of contacting temperature is easy.

In another treatment (second treatment) which can be applied in the purification step (i), first, the reaction mixture or crude modified phenolic resin having been obtained by the polycondensation reaction is dissolved in a solvent capable of dissolving the reaction mixture.

As this solvent capable of dissolving the reaction mixture, use can be made of, for example, toluene; a solvent mixture of toluene and an alcohol such as ethyl alcohol; a solvent mixture of toluene and a ketone such as acetone, methyl ethyl ketone or methyl isobutyl ketone; or a solvent mixture of toluene and an ether such as tetrahydrofuran, diethyl ether or methyl tert-butyl ether.

The solution obtained by dissolving the crude modified phenolic resin in the above solvent has a low viscosity and ensures easy operation, so that the purification operation can be accomplished easily.

The thus obtained solution is poured into a solvent comprising at least one compound selected from the group consisting of aliphatic hydrocarbons having 10 or less carbon atoms, alicyclic hydrocarbons having 10 or less carbon atoms and aliphatic petroleum fractions. As a result, a resin principal component is separated or precipitated, and thereby, removal of the components soluble in the solvent, i.e., the components remaining in unreacted or incompletely reacted form and the reaction solvent employed in the polycondensation reaction is attained.

Examples of these hydrocarbon solvents include aliphatic or alicyclic hydrocarbons such as pentane, hexane, heptane and cyclohexane and aliphatic petroleum fractions such as naphtha. Particularly, n-hexane and naphtha are preferred.

In a further treatment (third treatment) which can be applied in the purification step (i), first, the reaction mixture or crude modified phenolic resin having been obtained by the polycondensation reaction is dissolved in a solvent capable of dissolving the resin component.

As this solvent capable of dissolving the resin component, use can be made of, for example, acetonitrile, methanol and dimethyl sulfoxide.

Subsequently, the obtained solution is contacted with the extraction solvent which is capable of dissolving unreacted components, different components remaining because of low reactivity, reaction solvent employed in the polycondensation reaction, etc., and can be separated from the solution containing the modified phenolic resin to form a liquid-liquid binary layer system. Then, the above unreacted components are extracted and removed from the solution containing the modified phenolic resin.

This extraction solvent can appropriately be selected depending on the dissolution solvent. For example, when acetonitrile, methanol or dimethyl sulfoxide is employed as the dissolution solvent, use can be made of a solvent comprising at least one compound selected from the group consisting of aliphatic hydrocarbons having 10 or less carbon atoms, alicyclic hydrocarbons having 10 or less carbon atoms and aliphatic petroleum fractions, for example, n-hexane or heavy naphtha (boiling point: 80 to 150° C.).

The volume ratio of extraction solvent to solution of crude modified phenolic resin (extraction solvent/solution), although not particularly limited, is generally in the range of 10/90 to 90/10, preferably 20/80 to 80/20.

In this third treatment, the efficiency of removing unreacted components, etc. is enhanced, and, after extraction, the extraction solvent can easily be separated from and removed from the solution.

In still a further treatment (fourth treatment) which can be applied in the purification step (i), first, the reaction mixture or crude modified phenolic resin obtained by the polycondensation reaction is allowed to stand still in heated molten form.

The unreacted components, components remaining because of low reactivity, reaction solvent employed in the polycondensation reaction, etc. are separated as a supernatant from the modified phenolic resin by allowing the crude modified phenolic resin to stand still in heated form.

In the fourth treatment, the crude modified phenolic resin is generally held in heated molten form at 70 to 200° C., preferably 80 to 180° C., and more preferably 80 to 150° C., and is generally allowed to stand still for 15 min to 4 hr, preferably 20 min to 4 hr.

In this fourth treatment, the supernatant containing unreacted components, etc. can easily be separated and removed from the modified phenolic resin by decantation. Therefore, the fourth treatment is advantageous in that it is not needed to use a solvent or the like in the removal of unreacted components.

In still a further treatment (fifth treatment) which can be applied in the purification step (i), the reaction mixture or crude modified phenolic resin obtained by the polycondensation reaction is directly subjected to a molecular distillation conducted in high vacuum of $10^{-7}$ to $10^{-4}$ mmHg in order to remove the unreacted components, components remaining because of low reactivity, reaction solvent employed in the polycondensation reaction, etc.

In this fifth treatment, a dry modified phenolic resin not involving unreacted components, etc. can directly be obtained. Therefore, the fifth treatment is advantageous in that the operation for separating, for example, the solvent containing unreacted components, etc. is not needed.

In a final mode (sixth treatment) which can be applied in the purification step (i), first, the crude modified phenolic resin is dissolved in a dissolution solvent to thereby obtain a reaction mixture solution.

For example, the organic solvents set forth above in the first treatment can be used as this dissolution solvent. A solvent mixture of toluene and a ketone, especially a solvent mixture of toluene and methyl isobutyl ketone, is particularly suitable.

Subsequently, the obtained solution is mixed with water and allowed to stand still. Thus, a three-layer solvent system consisting of a layer of modified phenolic resin solution and, superimposed in sequence thereupon, a water layer and an unreacted oil layer is formed, and the unreacted oil layer and water layer are removed.

In this sixth treatment, the unreacted oil layer is completely separated by means of water from the modified phenolic resin layer. Therefore, the sixth treatment is advantageous in that not only can secure and easy removal thereof be accomplished but also the acid catalyst is extracted into the water layer to thereby facilitate the subsequent purification step (ii).

In the sixth treatment, the amount of dissolution solvent is controlled so that the specific gravity of the layer of modified phenolic resin solution is greater than that of water layer. When the amount of dissolution solvent is in excess, unfavorably, the specific gravity of the modified phenolic resin layer is so low, less than 1, that the lowermost layer is constituted by water layer.

The above first to sixth treatments of the purification step (i) may be performed either individually or in combination.

The resultant modified phenolic resin highly freed of unreacted components does not exhibit any heating weight loss and is advantageous in that its reactivity with an epoxy resin is enhanced.

When the second treatment is not performed, the first and third to sixth treatments may be combined with the treatment of directly adding the crude modified phenolic resin into the solvent comprising at least one compound selected from the group consisting of aliphatic hydrocarbons having 10 or less carbon atoms, alicyclic hydrocarbons having 10 or less carbon atoms and aliphatic petroleum fractions.

In the first treatment, among the first to sixth treatments which can be applied in the purification step (i), the polycondensation reaction mixture is contacted with a specified extraction solvent at such a temperature that the polycondensation reaction mixture becomes fluid, and thereby removing the components remaining unreacted in the polycondensation reaction by extraction with the extraction solvent. Therefore, the first treatment is advantageous, as compared with, for example, the second treatment in which the polycondensation reaction product is placed in an extraction solvent so as to effect separation or precipitation, in that not only is setting of conditions for unreacted component extraction easy but also the efficiency of removing unreacted components is high. Further, because of using no solvent, simplification of the unreacted component extracting operation and reduction of the cost for purification of modified phenolic resin can be attained.

In the aforementioned purification treatment (ii), the acid catalyst remaining in the reaction mixture is removed from the mixture, with the result that the modified phenolic resin substantially not containing any acids can be obtained.

When an organic acid or an inorganic acid is employed as the acid catalyst, the purification treatment (ii) is carried out by subjecting the reaction mixture, directly or after dissolution in a specified solvent, to washing with water or cleaning with an alkaline aqueous solution so that any catalyst residue is removed. The alkaline cleaning is advantageous in that unreacted phenol can be removed together with the acid catalyst.

The solvent for dissolving the reaction mixture is not particularly limited. For example, however, it can be any of alcohols such as methyl alcohol and ethyl alcohol; ketones such as acetone, methyl ethyl ketone and methyl isobutyl ketone; ethers such as tetrahydrofuran, diethyl ether and methyl tert-butyl ether; aromatic compounds such as toluene and xylene; and mixtures thereof.

As the alkali for use in the preparation of the alkaline aqueous solution, for example, sodium hydroxide, potassium hydroxide, magnesium hydroxide, calcium hydroxide and sodium hydrocarbonate may be cited.

In the purification treatment (ii), when a solid acid is used as the acid catalyst, any catalyst residue can be easily removed by filtering the reaction mixture. In this purification treatment (ii) as well, the reaction mixture may be dissolved in the above solvent in order to ease the filtration operation, etc.

Further, when oxalic acid is used as the acid catalyst in the purification treatment (ii), the oxalic acid can be decomposed and removed by heating the reaction mixture up to 180° C. or higher.

The above purification treatment (i) and purification treatment (ii) can be performed in arbitrary sequence. Further, in the purification treatment (iii), the reaction mixture, as its intact state or after removing unreacted components, acid catalyst, etc. by the purification treatment (i) and/or purification treatment (ii), is subjected to steam distillation, nitrogen blowing, vacuum distillation, etc. in order to remove remaining unreacted phenol. The removal of unreacted phenol may be effected by either any one or a combination of these methods.

Since the modified phenolic resin which substantially does not involve any acids can be obtained by performing these purification treatments to remove the acid catalyst, unreacted components, reaction solvent, etc. remaining in the resin, the purified resin does not corrode metals and which has increased reactivity with an epoxy resin, and thereby having enhanced heat resistance and dimensional stability. The words "substantially does not involve any acids" used herein means that no acids remain at all in the resin or, an extremely small amount of acids remain, wherein the amount is within a level of not showing any significant corrosive power to metals.

The modified phenolic resin obtained by the process of the present invention has an extremely low softening point so as to be flowable at about room temperature, exhibits high reactivity with an epoxy resin, and is also excellent in heat resistance, adhesive property and moisture resistance. Therefore, the modified phenolic resin combined with an epoxy resin ensures excellent moldability and enables the resultant molding to have enhanced mechanical properties (such as dimensional stability), moisture resistance, heat resistance and adhesive force. Further, as described above, the modified phenolic resin which has substantially no acid can be produced. When using this type, the corrosive phenomena to metal members can be reduced. Still further, the mechanical strength, electrical insulation and other properties of the molded articles can be improved by loading the modified phenolic resin with an inorganic filler.

The molding material obtained by combining the modified phenolic resin produced by the process of the present invention with an epoxy resin is useful as a material for electrical and electronic devices such as a printed board, an insulator and a sealer which are required to meet extremely strict specifications regarding dimensional stability, heat resistance, moldability, etc. Furthermore, the molding material is useful as a semiconductor sealer for which the improvement of moisture resistance, dimensional stability as countermeasures to stress damage attributed to high integration, heat resistance, etc. is required.

By virtue of the characteristic of flowable at about room temperature, the modified phenolic resin is also useful as a liquid sealer for semiconductors. The liquid semiconductor sealer means a sealer which exhibits fluidity in, for example, liquid or paste form at room temperature.

EFFECT OF THE INVENTION

The process of the present invention enables providing a modified phenolic resin which, as compared with the conventional modified phenolic resin produced from a heavy oil or pitch as a feedstock, has an extremely low softening point, therefore being flowable even at about room temperature (25° C.), and has a low melt viscosity, thereby ensuring very excellent moldability, and which modified phenolic resin, in combination with an epoxy resin, can be formed into a molded article being excellent in not only heat resistance, moisture resistance, corrosion resistance and adhesive force but also mechanical properties such as dimensional stability and strength.

Moreover, the modified phenolic resin obtained by the process of the present invention is highly useful as a liquid sealer for semiconductors by virtue of the characteristic of being flowable at about room temperature.

EXAMPLE

The present invention will further be illustrated below with reference to the following Examples, which in no way limit the scope of the invention.

In the following Examples, the parts are all on a weight basis, unless otherwise specified. The characteristics of stock oils X to Z as reaction feedstocks are listed in Table 1 below.

TABLE 1

|  | Stock oil X | Stock oil Y | Stock oil Z |
|---|---|---|---|
| type of oil | fluid catalytic cracking bottom oil | fluid catalytic cracking bottom distillation oil | catalytic reforming bottom oil |
| av. mol. wt. | 324 | 235 | 171 |
| b.p. (° C.) | 310–510 | 196–455 | 192–451 |
| ratio of arom. hydrocarbon (fa) | 0.66 | 0.69 | 0.70 |
| ratio of arom. ring hydrogen (Ha) (%) | 25 | 29 | 33 |

In the following Examples, the hydroxyl equivalent, softening point, 100° C. viscosity and number average molecular weight were measured by the following instruments and methods.

<Hydroxyl Equivalent>

It is measured by the conversion to acetyl chloride method.

<Softening Point>

It is measured by ring and ball automatic tester (model ASP-MGK-2) manufactured by Meitech Co., Ltd.

<100° C. Viscosity>

It is measured by the use of ICI cone plate viscometer manufactured by ICI.

<Number Average Molecular Weight>

It is calculated with the use of polystyrene as a reference material from data obtained by means of GPC measuring apparatus HLC-8020 manufactured by Tosoh Corporation (column: TSK gel 3000HXL+TSK gel 2500HXL×3, reference material: polystyrene).

Example 1

100 g of stock oil X, 844 g of 2-allylphenol (i.e., 2-(2-propenyl)phenol), 60 g of paraformaldehyde and 6 g of oxalic acid were added in a 2-liter glass reaction vessel, and heated up to 100° C. over a period of 20 min under stirring at a speed of 250 to 350 rpm. Reaction was continued for 100 min while maintaining the temperature. Thus, a reaction product was obtained.

This reaction product was allowed to stand still until the temperature was lowered to 50° C. Unreacted stock oil separated so as to form an upper layer was removed by decantation. Thus, a crude modified phenolic resin was obtained.

This crude modified phenolic resin was subjected to vacuum distillation until the distillation of 2-(2-propenyl) phenol was completed. Further, nitrogen was blown thereinto at 190° C., thereby completely removing 2-(2-propenyl) phenol.

300 ml of heavy naphtha was added to the obtained resin and stirred at 100° C. for 30 min under reflux so that unreacted oil remaining in the resin was extracted. Thereafter, the heavy naphtha containing unreacted stock oil was removed by decantation.

Thereafter, the obtained resin was heated up to 160° C. under nitrogen atmosphere, and the remaining heavy naphtha was removed by maintaining the temperature for 1 hr. Thus, 403 g of a modified phenolic resin was obtained.

The hydroxyl equivalent, softening point, 100° C. viscosity and number average molecular weight of the obtained modified phenolic resin were determined, and the results are listed, together with the reaction conditions, in Table 2.

Comparative Example 1

303 g of a modified phenolic resin was obtained in the same manner as in Example 1, except that 592 of phenol was used in place of the 2-allylphenol.

The hydroxyl equivalent, softening point, 100° C. viscosity and number average molecular weight of the obtained modified phenolic resin were determined, and the results are listed, together with the reaction conditions, in Table 2.

Example 2

Modified phenolic resin was produced in the same manner as in Example 1, except that the amount of paraformaldehyde was as specified in Table 2.

The hydroxyl equivalent, softening point, 100° C. viscosity and number average molecular weight of the obtained modified phenolic resin were determined, and the results are listed, together with the reaction conditions, in Table 2.

Comparative Example 2

Modified phenolic resin was produced in the same manner as in Comparative Example 1, except that the amount of paraformaldehyde was as specified in Table 2.

The hydroxyl equivalent, softening point, 100° C. viscosity and number average molecular weight of the obtained modified phenolic resin were determined, and the results are listed, together with the reaction conditions, in Table 2.

Examples 3 to 10

Modified phenolic resins were produced in the same manner as in Example 1, except that the type of stock oil and the amounts of 2-allylphenol, paraformaldehyde and oxalic acid were changed as specified in Table 2.

The hydroxyl equivalent, softening point, 100° C. viscosity and number average molecular weight of each of the obtained modified phenolic resins were determined, and the results are listed, together with the reaction conditions, in Table 2.

TABLE 2

|  |  | Ex. 1 | Ex. 2 | Ex. 3 | Ex. 4 | Ex. 5 | Ex. 6 | Ex. 7 | Ex. 8 | Ex. 9 | Ex. 10 | Comp. Ex. 1 | Comp. Ex. 2 |
|---|---|---|---|---|---|---|---|---|---|---|---|---|---|
| Stock oil X | (g) | 100 | 100 | 100 | 100 | 100 | 100 |  |  | 100 |  | 100 | 100 |
| Y | (g) |  |  |  |  |  |  | 100 |  |  |  |  |  |
| Z | (g) |  |  |  |  |  |  |  | 100 |  | 100 |  |  |
|  | (mol ratio) | 1.0 | 1.0 | 1.0 | 1.0 | 1.0 | 1.0 | 1.0 | 1.0 | 1.0 | 1.0 | 1.0 | 1.0 |
| 2-allylphenol | (g) | 844 | 844 | 844 | 294 | 454 | 1688 | 1123 | 1962 | 1688 | 39 | — | — |
|  | (mol ratio) | 25.0 | 25.0 | 25.0 | 8.72 | 13.44 | 50.0 | 25.0 | 25.0 | 50.0 | 0.5 |  |  |
| phenol | (g) | — | — | — | — | — | — | — | — | — | — | 592 | 592 |
|  | (mol ratio) |  |  |  |  |  |  |  |  |  |  | 25 | 25 |
| paraformaldehyde | (g) | 60 | 121 | 45 | 36 | 58 | 121 | 80 | 140 | 189 | 5 | 60 | 121 |
|  | (mol ratio) | 8.0 | 16.0 | 6.0 | 4.76 | 7.66 | 16.0 | 8.0 | 8.0 | 25.0 | 0.3 | 8.0 | 16.0 |
| oxalic acid | (g) | 6 | 6 | 6 | 3 | 4 | 11 | 8 | 13 | 12 | 1 | 5 | 5 |
| reaction temp. | (° C.) | 100 | 100 | 100 | 100 | 100 | 100 | 100 | 100 | 100 | 100 | 100 | 100 |
| reaction time | (min) | 120 | 120 | 120 | 120 | 120 | 120 | 120 | 120 | 120 | 120 | 120 | 120 |
| yield | (g) | 403 | 668 | 306 | 146 | 274 | 807 | 556 | 893 | 1206 | 15 | 303 | 480 |
| hydroxyl equiv. | (g/eq) | 173 | 177 | 179 | 188 | 183 | 164 | 170 | 161 | 166 | 220 | 122 | 122 |
| softening pt. | (° C.) | <5 | 19 | <5 | 25 | 20 | <5 | <5 | <5 | <5 | 25 | 48 | 74 |
| visc. (ICI; 100° C.) | (p) | 0.24 | 0.83 | 0.21 | 1.5 | 1.0 | 0.23 | 0.19 | 0.20 | 0.37 | 1.5 | 2.5 | 43.2 |
| no. av. mol. wt. |  | — | 573 | 707 | 553 | 766 | 727 | 570 | 586 | 602 | 689 | 649 | 497 | 695 |

What is claimed is:

1. A process for producing a modified phenolic resin, comprising heating:
    a heavy oil or pitch of given average molecular weight;
    0.3 to 25 mol, in terms of formaldehyde, a formaldehyde compound per mol, calculated from the average molecular weight, of said heavy oil or pitch; and
    0.5 to 50 mol of an allylphenol per mol, calculated from the average molecular weight, of said heavy oil or pitch, under stirring in the presence of an acid catalyst to effect a polycondensation.

2. The process as claimed in claim 1, wherein said heavy oil or pitch is a petroleum heavy oil or pitch.

3. The process as claimed in claim 1, wherein said heavy oil or pitch is a distillate or residue oil obtained by one of a catalytic cracking operation, a thermal cracking operation and a catalytic reforming operation of an oil refinery process, said distillate or residue oil exhibiting a lower limit of boiling point (distillate outflow initiation temperature) of not less than 170° C., said distillate or residue oil having a ratio of aromatic hydrocarbon (fa value) of 0.40 to 0.95 and a ratio of aromatic ring hydrogen (Ha value) of 20 to 80%.

4. The process as claimed in claim 1, wherein said heavy oil or pitch is a coal heavy oil or pitch.

5. The process as claimed in claim 2, wherein said petroleum heavy oil or pitch comprises condensed polycyclic aromatic hydrocarbons, each of which has at least two rings.

6. The process as claimed in claim 4, wherein said coal heavy oil or pitch comprises condensed polycyclic aromatic hydrocarbons, each of which has at least two rings.

7. The process as claimed in claim 3, wherein said heavy oil or pitch is subjected to a paraffin removal treatment.

8. The process as claimed in claim 1, wherein said formaldehyde compound is selected from the group consisting of formaldehyde, paraformaldehyde, polyoxymethylene and trioxane.

9. The process as claimed in claim 1, wherein said acid catalyst is selected from the group consisting of Brønsted acids and Lewis acids.

10. The process as claimed in claim 1, wherein said acid catalyst is in an amount not less than 0.01 mol or more than 2 mol, per mol, calculated from the average molecular weight, of said heavy oil or pitch.

11. The process as claimed in claim 1, wherein said heating is carried out between 50–200° C. for a period of 15 minutes to 8 hours.

12. The process as claimed in claim 1, wherein said modified phenolic resin has a hydroxyl equivalent ranging from 150 to 250.

13. The process as claimed in claim 1, wherein said modified phenolic resin is subjected to purification.

* * * * *